Patented June 17, 1952

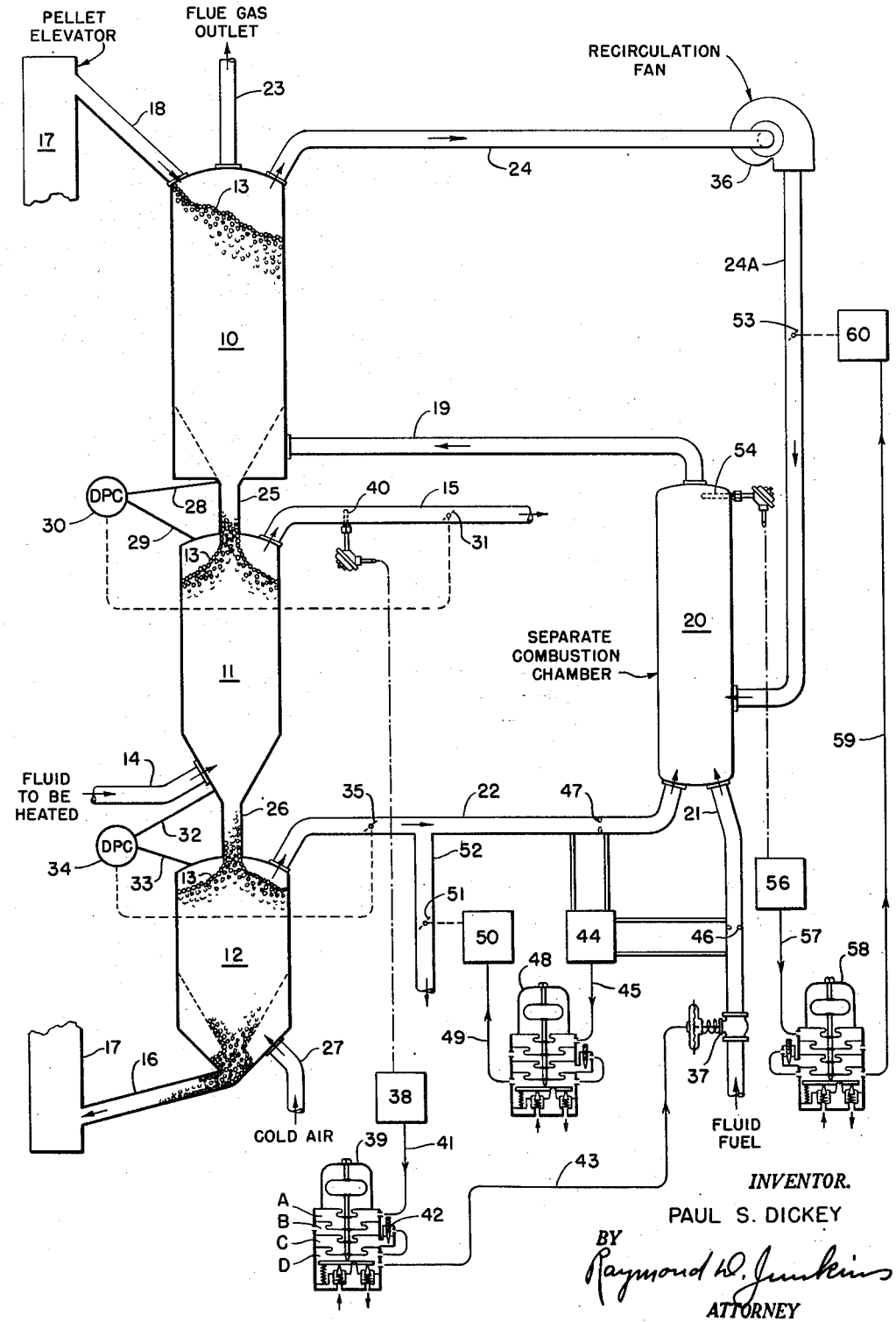

2,601,102

UNITED STATES PATENT OFFICE 2,601,102

HEAT EXCHANGER CONTROL

Paul S. Dickey, East Cleveland, Ohio, assignor, by mesne assignments, to The Babcock & Wilcox Company, New York, N. Y., a corporation of New Jersey Application June 25, 1948, Serial No. 35,175

16 Claims. (Cl. 263—19)

My present invention relates in general to the operation and control of fluid heaters of the type in which the heat transfer medium consists of a fluent gas-pervious mass of refractory material which is first heated by the passage of a heating fluid in heat transfer relation therewith and is then cooled by contact with fluid to be heated; and more particularly to fluid heaters of the character illustrated and described in which the mass of heat transfer material in the form of pellets moves by gravity downwardly through a series of superposed heating and cooling chambers or zones connected by one or more throats of reduced flow area but structurally unobstructed, elevating the pellets to a point above the upper chamber, and again allowing them to move by gravity through the several chambers.

The heater may comprise a multiplicity of superposed refractory lined chambers, one or more of which may be adapted for the continuous heating of refractory pellets while one or more of the chambers is adapted for the heating of fluids by contact with the descending stream of hot pellets. The refractory pellets are arranged for gravity flow through the chambers and connected throat sections and then for external return from the lowermost chamber to the uppermost chamber. Certain arrangements of control and the operation of such a heater form particular features of my present invention.

In the illustrated example, pellets are heated in an upper chamber by contact with a countercurrent stream of hot combustion gases after which they pass by gravity into a treating chamber where they treat the fluids being processed. A third chamber is positioned below the treating chamber to effect a preheating of the air for combustion purposes in connection with the pellet heating chamber and to cool pellets therein. Pellets emerging from the third or lowermost chamber are sufficiently cool to be handled by ordinary metallic elevator equipment external of the heat transfer chambers. Thus the residual heat in the heat transfer material or pellets can be recovered by direct contact with air for use as an element of combustion in the generation of a heating fluid for the upper chamber.

In generating the hot gaseous products of combustion to form a heating medium for the upper pellet heating chamber, I preferably employ a separate external combustion chamber to which fuel and air are controllably supplied. I further arrange for the recirculation of a portion of the relatively cooled products of combustion leaving the upper chamber back to the separate combustion chamber for tempering the heating medium both as to oxygen content and as to temperature. Thus the flow of heating medium to the upper chamber, for heating the pellets therein, is a composite of hot gaseous elements of combustion and some recirculated gases. The principal feature of the present invention lies in the operation and control of the apparatus mentioned to regulate the quality and quantity of the heating medium supply to the upper chamber.

A general object of my invention is the provision of a method of and apparatus for operating and controlling fluid heating apparatus of the character disclosed, for continuously heating a fluid under pressure at high capacity to a uniform final temperature in a range whose upper temperature limit is dependent only upon the physical properties, such as the fusing temperature, of the refractory materials employed, with little or no contamination of the fluids being heated by the heating fluid employed and vice versa, without subjecting any included metallic parts present to unsafe operating temperatures or requiring special corrosion and heat resistant alloys for metal operating temperatures over 900° F., and with a relatively high overall thermal efficiency.

One object is to provide a control system for the apparatus described which is characterized by its ability to maintain balanced fluid pressures within the apparatus to prevent intermingling of the fluids from one chamber to another.

A further object of the invention is to provide an apparatus adapted for use in a continuous process characterized by its ability to transfer high temperatures to a fluid being heated at a higher rate of heat transfer than heretofore practical. Still another object is to provide a process and apparatus of the above noted type in which the reaction time can be controlled within narrow limits. A further object is to protect against overheating of the chamber lining.

A still further object is to provide a heating means for the pellets which is regulated as to composition and temperature as well as rate of flow and to accomplish this through the most economical utilization of fuel used for providing heated products of combustion as a basic constituent of the heating medium.

In the particular embodiment of my invention which I have illustrated and will describe the fluid to be heated in the center chamber may be steam to be superheated or air to be elevated in temperature. The arrangement might equally as well be used in the thermal conversion of liquid or gaseous hydrocarbons at high temperatures and low pressures in which the temperature in the reaction zone can be controlled within narrow limits thereby permitting efficient and consistent cracking of the hydrocarbon feed. It will be understood however that these are by way of example only and are not to be taken as limiting.

In the drawing the single figure is a diagrammatic showing, in elevation, of a three chamber heat exchanger to which my control system has been applied. It has appeared unnecessary to complicate the showing by details of the construction of the heat exchanger or of the elevator system for returning the pellets from the exit of the lowermost chamber to the inlet to the uppermost chamber. For such constructional arrangements reference may be had to the copending application of Ervin G. Bailey and Ralph M. Hardgrove, Serial No. 35,126, filed June 25, 1948. Thus the showing of the drawing is entirely diagrammatic insofar as the size, shape and general constructional arrangement of the principal apparatus is concerned. The apparatus which is concerned with the control of operation of such a heater unit, and to which my present invention is particularly directed, will be explained in detail.

The heating unit illustrated in the drawing is constructed and designed for the use of vapors or gaseous heating and heated fluids under pressure and as shown comprises as its main part an upper heating chamber 10 normally substantially filled with a downwardly moving fluent gas-pervious mass of refractory heat transfer material 13 to be heated by high temperature gases passing therethrough. There is shown a connected subjacent heat absorbing or reaction chamber 11 arranged to receive and normally substantially completely filled with heated refractory material 13 from the upper chamber, and in which the heated refractory material is utilized for heating a second fluid, in the present embodiment a vaporous fluid such as steam, to a predetermined temperature. By way of example, the steam may be admitted through a conduit 14 at a pressure of 25 p. s. i. saturated and desirably leaves through a conduit 15 at a total temperature of 2300° F.

Below the chamber 11, and connected thereto, is a third chamber 12 arranged to receive and normally substantially completely filled with heated refractory material 13 from the middle chamber 11, and in which the heated refractory material is utilized for heating a third fluid, which in the present embodiment is air, to be utilized as one of the elements of combustion to provide the heating medium for the refractory material in the uppermost chamber 10.

A pellet elevator 17 is provided for receiving the cooled refractory material from the lowermost chamber 12, through a discharge spout 16, and returning it to the upper part of the uppermost chamber 10. The elevator may be of any commercial type capable of handling the heated pellets and discharges at the top into a spout 18 leading to the top of the chamber 10. The branch 16 joining the exit of chamber 12 with the elevator 17 may be provided with controllable feeder means for variably allowing the pellets of refractory material 13 to feed from the chamber 12 into the elevator. By such means the rate of gravity flow of pellets 13 downwardly through the chambers 10, 11, 12 may be regulated and thus the time of contact of the pellets with the different fluids may be controlled. Such control forms no part of the present invention.

The fluid heating medium, for heating the pellets 13 in the chamber 10, is admitted to the lower portion of the chamber 10 by way of a conduit 19 from the outlet of a separate combustion chamber 20 whose function is to provide the heating medium supply.

The separate combustion chamber 20 is supplied with a fluid fuel through a conduit 21 and with heated air for supporting combustion through conduit 22. The hot gaseous products of combustion from the combustion chamber 20 are admitted through a lower portion of the chamber 10 to pass upwardly through the interstices of the gas-pervious fluent mass 13 in intimate counterflow contact with the descending pellets whereby the pellets are heated to a high temperature and the gases leave through a flue gas outlet 23 and a second conduit 24 at a relatively low temperature. The highly heated pellets 13 move downwardly by gravity in a column through chamber 10 and a throat 25 into the subjacent chamber 11. The fluid to be heated in the chamber 11, in the present embodiment being steam, is introduced through the conduit 14 to a lower portion of the chamber 11, under predetermined pressure, and passes upwardly through the interstices between the descending pellets 13 in the chamber 11 where it is heated in counterflow heat transfer and then passes out at the desired temperature through the outlet conduit 15.

The pellets 13 move slowly by gravity from a lower portion of the chamber 11, through a throat 26, into the upper portion of the chamber 12 where they are further cooled by heat transfer to combustion air admitted through a conduit 27 to a lowermost portion of the chamber 12 and passing upwardly through the interstices of the fluent gas-pervious material 13 to exit near the top of the chamber 12 into the conduit 22 for supplying heated combustion air to the furnace chamber 20.

The relative pressures in the chambers 10, 11 and 12 as well as the fluid flow between the chambers, or lack of fluid flow, is controlled by provisions disclosed in a copending application by Ervin G. Bailey and Ralph M. Hardgrove, Serial No. 502,580, filed September 16, 1943, now Patent 2,447,306 dated August 17, 1948, of which certain control features herein disclosed constitute improvements thereover. Connected to opposite ends of the throat section 25 are pressure pipes 28, 29 joining a differential pressure controller 30 which is arranged to position a damper 31 in the conduit 15. Connected to opposite sides of the throat 26, through pipe connections 32, 33 is a differential pressure controller 34 arranged to position a damper or valve 35 in the conduit 22 at the exit of chamber 12.

In general, the differential pressure controllers 30 and 34, through positioning of the dampers 31, 35, perform the functions of so regulating the pressures in the chambers 10, 11, 12 as to maintain a balance in pressure in the throats 25 and 26 and thereby substantially prevent any interflow of fluid from one of the chambers 10, 11 or 12 to another. While the static pressures in the chambers 10, 11 and 12 may not be the same, and the pressures compared across the throat 25 may not be the same as those compared across the throat 26, due to pressure drop through the chambers, the adjustment and action of the differential pressure controllers 30, 34 is such as to minimize fluid flow through the throats 25 and 26 in either direction. Such provision minimizes the dilution of the fluid in any chamber by that from another chamber. Furthermore prior impractical gate or valve structure in the throats 25 and 26 are avoided and free gravity egress of pellets permitted from an upper chamber to a lower chamber without substantial fluid passage from one fluid chamber to another through the interstices of the gas-pervious fluent mass passing by gravity downwardly from chamber 10 through throat 25 into chamber 11 and thence from chamber 11 through throat 26 into chamber 12.

The fluid heating medium supply for the chamber 10 is available through the conduit 19 from the separate combustion chamber 20. Joining the chamber 20 is a fluid fuel supply conduit 21 and a heated air supply conduit 22. The chamber 20 is also joined by a conduit 24 in which is interposed a recirculation fan 36.

The rate of supply of fluid fuel through the conduit 21 is controlled by a regulating valve 37 positioned by a pneumatic loading pressure established by a temperature controller 38 and relay 39. In the conduit 15 is a temperature sensitive element 40 for the controller 38 which latter establishes in a pipe 41 a fluid loading pressure continuously representative of the temperature of the heated fluid leaving the chamber 11 through the conduit 15. Inasmuch as temperature of the fluid at location 40, regardless of variation in rate of supply of fluid through the conduit 14, is the final desideratum of the system it is used as an index to establish the rate of supply of fuel to the combustion chamber 20 and thereby the rate of supply of heating medium to heat the pebbles in chamber 10.

The loading pressure in the pipe 41 is subjected upon the A chamber of a standardizing relay 39 which may be of a type described and claimed in Patent 2,098,914 to Harvard H. Gorrie. The B chamber of the relay is open to the atmosphere while the C and D chambers are joined by an adjustable bleed connection 42. The pressure within the D chamber is available through a pipe 43 to be effective upon the diaphragm of the regulating valve 37 for positioning the same. The arrangement is such that upon a departure of temperature at location 40 from the desired value, an immediate and proportional change takes place in the positioning of the valve 37 in a direction tending to restore the temperature to the desired value. Thereafter the standardizing relay 39 operates to gradually position the valve 37 until the temperature reaches the predetermined desired value.

Fuel and air supply rates through the conduits 21, 22 are desirably proportioned for most efficient combustion and economy in fuel consumption. Such proportioning is accomplished by a ratio controller 44 which establishes in a pipe 45 a pneumatic loading pressure continually representative of the ratio between the rate of flow of fluid fuel passing an orifice 46 and the rate of flow of combustion air passing an orifice 47. The loading pressure in pipe 45 is subjected upon the A chamber of a standardizing relay 48 similar to the relay 39. The output of the relay 48 is a control pressure in the D chamber thereof which is effective through a pipe 49 upon the controller 50 for positioning a damper 51 in a branch conduit 52 capable of bleeding heated combustion air from the conduit 22 to the atmosphere. Inasmuch as the basic flow of heated combustion air through the conduit 22 is under the control of the damper 35 desired slight variations in such flow, admitted to the chamber 20, may best be obtained by bleeding an excess to the atmosphere.

The separate combustion chamber 20 receives fluid fuel and heated combustion air in ratio and amount to satisfy the heat requirements of the fluid passing through the chamber 11 and raise the temperature of the fluid to the desired value at the temperature element 40. While the quantity rate of heat to the chamber 10 is thus controlled, the temperature of the heating medium passed through the conduit 19 may at times exceed a predetermined high value and possibly cause fusion of the pellets in chamber 10. As a safety control I provide a damper 53 in the conduit 24A thereby controlling the amount of spent combustion gases which are recirculated from the top of the chamber 10 to some location in the separate combustion chamber 20 wherein they will dilute or temper the products of combustion in desired manner.

Located near the exit of the combustion chamber 20 is a temperature responsive element which is connected to a temperature controller 56 arranged to establish a loading pressure in the pipe 57 continually representative of the temperature at the location 54. The pneumatic loading pressure within the pipe 57 is subjected upon the A chamber of a standardizing relay 58 which produces, in the pipe 59, a control pressure available to actuate a controller 60 for positioning the damper 53 and thus regulating the rate of recirculation from the top of chamber 10 to the combustion chamber 20 whereby the heating medium passing the element 54 is of minimum free oxygen content and of safe temperature.

It will be appreciated that the various control elements and arrangements described function continuously and simultaneously and that they are all interrelated for efficiency and safe operation of the heat transfer system toward the production of steam in the outlet conduit 15 at desired superheated temperature.

While I have chosen to illustrate and describe certain preferred embodiments of my invention it is to be understood that this is by way of example only and not to be considered as limiting.

What I claim as new and desire to secure by Letters Patent of the United States, is:

1. The method of operating a fluid heater of the type having three superposed chambers connected by throats with fluent gas-pervious heat transfer material in each of the chambers and in the throats and having provision for substantially continually moving such material by gravity downwardly progressively through the chambers and throats and exteriorly from the lowermost chamber back to the uppermost chamber including, maintaining a supply of heating medium to the upper chamber to heat the material as it passes therethrough, passing the fluid to be heated through the middle chamber in direct contact with the heated material passing therethrough, passing a second fluid to be heated through the lower chamber in direct contact with the heated material passing therethrough, separately supplying the elements of combustion to provide the supply of heating medium mentioned, one of the elements of combustion being the second fluid being heated in the lower chamber whose flow is controlled responsive to pressure differential across the throat connecting the middle and lower chambers, controlling the rate of supply of the other element of combustion responsive to temperature of the first fluid after it has been heated in the middle chamber, and diluting the products of combustion through recirculation of a portion of the heating medium after its passage through the uppermost chamber.

2. The method of operating a fluid heater of the type having three superposed chambers connected by throats with fluent gas-pervious heat transfer material in each of the chambers and in the throats and having provision for substantially continually moving such material by gravity downwardly progressively through the chambers and throats and exteriorly from the lowermost chamber back to the uppermost chamber including, maintaining a supply of heating medium to the upper chamber to heat the material as it passes therethrough, passing a fluid to be heated through the middle chamber in direct contact with the heated material passing therethrough, passing a second fluid to be heated through the lower chamber in direct contact with the heated material passing therethrough, separately supplying the elements of combustion to provide the supply of heating medium mentioned, air as one of the elements of combustion being the second fluid being heated in the lower chamber, controlling the rate of discharge of air from the lower chamber responsive to pressure differential across the throat connecting the middle and lower chambers, and diluting the products of combustion through recirculation of a portion of the heating medium after its passage through the upper chamber.

3. The method of operating a fluid heater of the type having three superposed chambers connected by throats with fluent gas-pervious heat transfer material in each of the chambers and in the throats and having provision for substantially continually moving such material by gravity downwardly progressively through the chambers and throats and exteriorly from the lowermost chamber back to the uppermost chamber including, maintaining a supply of heating medium to the upper chamber to heat the material as it passes therethrough, passing a fluid to be heated through the middle chamber in direct contact with the heated material passing therethrough, passing a second fluid to be heated through the lower chamber in direct contact with the heated material passing therethrough, separately supplying the elements of combustion to provide the supply of heating medium mentioned, air as one of the elements of combustion being the second fluid being heated in the lower chamber, controlling the rate of discharge of air from the lower chamber responsive to pressure differential across the throat connecting the middle and lower chambers, and controlling the rate of supply of fuel as the other element of combustion responsive to temperature of the first fluid after it has been heated in the middle chamber.

4. The method of operating a fluid heater of the type having three superposed chambers connected by throats with fluent gas-pervious heat transfer material in each of the chambers and in the throats and having provision for substantially continually moving such material by gravity downwardly progressively through the chambers and throats and exteriorly from the lowermost chamber back to the uppermost chamber including, maintaining a supply of heating medium to the upper chamber to heat the material as it passes therethrough, passing a fluid to be heated through the middle chamber in direct contact with the heated material passing therethrough, passing a second fluid to be heated through the lower chamber in direct contact with the heated material passing therethrough, separately supplying fuel and air as the elements of combustion to provide the supply of heating medium mentioned, the air for combustion being the second fluid to be heated in the lower chamber, separately measuring the rate of supply of the fuel and of the air, comparing the measurements, and controlling the rate of supply of heated air for combustion in predetermined ratio to the rate of supply of fuel by bleeding heated air to waste under the control of the comparison of measurements.

5. The method of operating a fluid heater of the type having three superposed chambers connected by throats with fluent gas-pervious heat transfer material in each of the chambers and in the throats and having provision for substantially continually moving such material by gravity downwardly progressively through the chambers and throats and exteriorly from the lowermost chamber back to the uppermost chamber including, maintaining a supply of heating medium to the upper chamber to heat the material as it passes therethrough, passing a fluid to be heated through the middle chamber in direct contact with the heated material passing therethrough, passing a second fluid to be heated through the lower chamber in direct contact with the heated material passing therethrough, separately supplying fuel and air as the elements of combustion to provide the supply of heating medium mentioned, the air for combustion being the second fluid to be heated in the lower chamber controlled in response to pressure differential across the throat connecting the middle and lower chambers, and continually maintaining desired ratio between rate of supply of air and of fuel by bleeding heated air to waste prior to joining the fuel for combustion.

6. The combination with a fluid heater having an upper chamber enclosing a fluent gas-pervious mass of solid heat transfer material, a lower chamber enclosing a mass of such material, a passage forming a throat between said upper and lower chambers and enclosing a mass of such material connecting said material masses, means external of said chambers and throat to return the material from an exit in the lower chamber to an inlet to the upper chamber, of a heating medium supply for the material in the upper chamber, a supply of fluid to be heated passed through the lower chamber in direct contact with the heated material therein, and means arranged to recirculate a portion of the heating medium after it has contacted the heating material in the upper chamber to dilute the heating medium stream at a location in its flow path prior to its entry to the said upper chamber.

7. The combination of claim 6 including a control device for regulating the recirculating means, and a temperature measuring device sensitive to a temperature condition of the heating medium adapted to position the control device.

8. The combination of claim 6 including a separate combustion chamber for producing the heating medium, a supply of fuel and a supply of air for combustion to said separate combustion chamber, the recirculating means joining the said separate combustion chamber for introducing thereto a controllable flow of waste heating medium to dilute the products of combustion, a control device for regulating the recirculating means, and a temperature measuring device sensitive to a temperature of the heating medium and arranged to position the control device.

9. The combination with a fluid heater having an upper chamber enclosing a fluent gas-pervious mass of solid heat transfer material, a lower chamber enclosing a mass of such material, a passage forming a throat between said upper and lower chambers and enclosing a mass of such material connecting said material masses, means external of said chambers and throat to return the material from an exit in the lower chamber to an inlet to the upper chamber, of a heating medium supply for the material in the upper chamber, a supply of fluid to be heated passed through the lower chamber in direct contact with the heated material therein, means arranged to recirculate a portion of the heating medium after it has contacted the heating material in the upper chamber to dilute the heating medium stream at a location in its flow path prior to its entry to the said upper chamber, a separate combustion chamber for producing the heating medium, a supply of fuel and a supply of air for combustion to said separate combustion chamber, the recirculating means joining the said separate combustion chamber for introducing thereto a controllable flow of waste heating medium to dilute the products of combustion, a control device for regulating the recirculating means, a temperature measuring device sensitive to temperature of the heating medium supplied to the upper chamber, and means responsive to said temperature measuring device and arranged to position the control device.

10. The combination with a fluid heater having three superposed chambers connected by structurally unobstructed throats of reduced cross-section, a mass of fluent gas-pervious heat transfer material in the form of pellets confined by the chambers and throats, said mass substantially continually moving progressively downwardly by gravity through the chambers and throats, means returning the pellets from an exit from the lowermost chamber to an inlet to the uppermost chamber, of a heating medium supply for the material in the uppermost chamber, a supply of a first fluid to be heated passed through the middle chamber in direct contact with the heated material therein, a supply of air as an element of combustion for the supply of heating medium passed through the lowermost chamber in direct contact with the heated material therein for heating the air, a supply system of fuel for combustion to form the heating medium, a separate combustion chamber to which the air and fuel supply systems feed, a conduit for the heating medium joining the outlet of the combustion chamber with the inlet to the uppermost chamber, a second conduit connecting the exit of the uppermost chamber with a point in the combustion chamber, pump means in the second conduit recirculating a portion of spent heating medium to the combustion chamber to dilute the products of combustion, and a device sensitive to temperature of the heating medium leaving the combustion chamber arranged to control the flow in the second conduit.

11. The combination of claim 10 including means controlling rate of flow of heated air leaving the lower chamber responsive to pressure differential between the lower end of the middle chamber and the upper end of the lower chamber.

12. The combination of claim 10 including a regulating valve for the fuel supply system, and means responsive to temperature of the heated fluid leaving the middle chamber adapted to control said regulating valve.

13. The combination of claim 12 including means controlling rate of flow of heated air leaving the lower chamber responsive to pressure differential across the throat connecting the middle and lower chambers.

14. The combination with a fluid heater having three superposed chambers connected by structurally unobstructed throats of reduced cross-section, a mass of fluent gas-pervious heat transfer material in the form of pellets confined by the chambers and throats, said mass substantially continually moving progressively downwardly by gravity through the chambers and throats, means returning the pellets from an exit from the lowermost chamber to an inlet to the uppermost chamber, of a heating medium supply for the material in the uppermost chamber, a supply of a first fluid to be heated passed through the middle chamber in direct contact with the heated material therein, a supply of air as an element of combustion for the supply of heating medium passed through the lowermost chamber in direct contact with the heated material therein for heating the air, a supply system for fuel for combustion to form the heating medium, a separate combustion chamber to which the air and fuel supply systems feed, a first rate meter for the air supply, a second rate meter for the fuel supply, means for comparing the rates from said meters, and control means for keeping the rate of supply of heated air for combustion in predetermined ratio to the rate of supply of fuel by bleeding heated air to waste under the control of said comparison means.

15. The combination of claim 14 including means for controlling the rate of discharge of heated air from the lower heating chamber responsive to pressure differential across the throat connecting the middle and lower chambers.

16. The combination with a fluid heater having three superposed chambers connected by structurally unobstructed throats of reduced cross-section, a mass of fluent gas-pervious heat transfer material in the form of pellets confined by the chambers and throats, said mass substantially continually moving progressively downwardly by gravity through the chambers and throats, means returning the pellets from an exit from the lowermost chamber to an inlet to the uppermost chamber, of a heating medium supply including a combustion chamber for the material in the uppermost chamber, a supply of a first fluid to be passed through the middle chamber in direct contact with the heated material therein, a supply of a first element of combustion for the supply of heating medium through the lowermost chamber in direct contact with the heated material therein, means for separately supplying the first element and a second element of combustion to provide the supply of heating medium to the uppermost chamber, means for controlling the rate of supply of the second element of combustion to the combustion chamber in response to the temperature of the first fluid after it has been heated in the middle chamber, and means for recirculating a portion of the heating medium for dilution of the products of combustion after its passage through the uppermost chamber.

PAUL S. DICKEY.

REFERENCES CITED

The following references are of record in the file of this patent:

UNITED STATES PATENTS

| Number | Name | Date |
| --- | --- | --- |
| 1,896,910 | Merkt | Feb. 7, 1933 |
| 1,933,020 | Leamon | Oct. 31, 1933 |
| 2,399,450 | Ramseyer | Apr. 30, 1946 |
| 2,417,049 | Bailey et al. | Mar. 11, 1947 |